X 8546
A. H. Searle,
Making Farm Implements,
Patented Dec. 17, 1834.
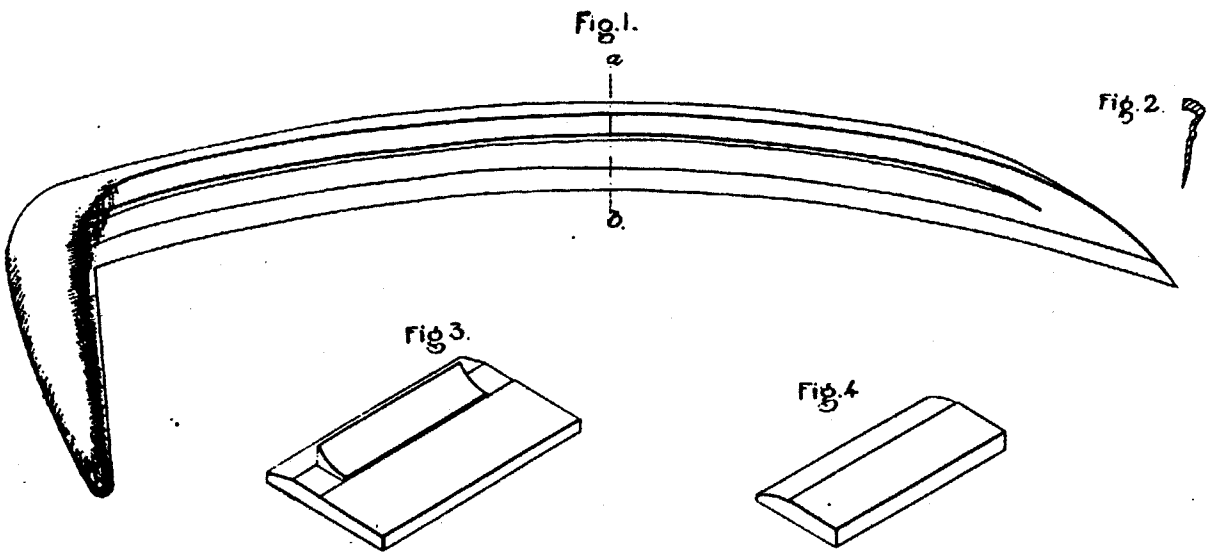

12/17/1834 X8546.

Dec. 17 1834 143.

Augustus H. Searle of Indianapolis, County of Marion, Indiana.

The Schedule referred to in these Letters Patent and making part of the same containing a description in the words of the said Augustus H. Searle, himself, of his Improvement in the manner or Art of Manufacturing Scythes.

To all to whom these presents shall come.

Be it known that I, Augustus H. Searle late of Chelmsford, in the County of Middlesex, and Commonwealth of Massachusetts, now of Indianapolis in the County of Marion, and State of Indiana, have invented a new and useful improvement in the manner or art of manufacturing scythes, and that the following is a full and exact description thereof.

It consists in raising the edge part of the web of a scythe, & in sinking the back part of the web, by means of steel dies, confined in hammers, operated by water or steam power, in such manner, as shall produce a small shoulder, or stay on each side of the web, and is in effect a second back or stay on each side of the scythe. Two sets of dies, models of those I use in the manufacture of scythes, as above described, together with two scythes, manufactured by the use of them, I have transmitted.

Witnesses

Stoughton A. Fletcher

Edwin J. Peck

Augustus H. Searle.

(216 words)

Patented December 17, 1834.